July 22, 1958 P. AUDEMAR 2,844,418
SHAFT SEAL
Filed Oct. 10, 1957
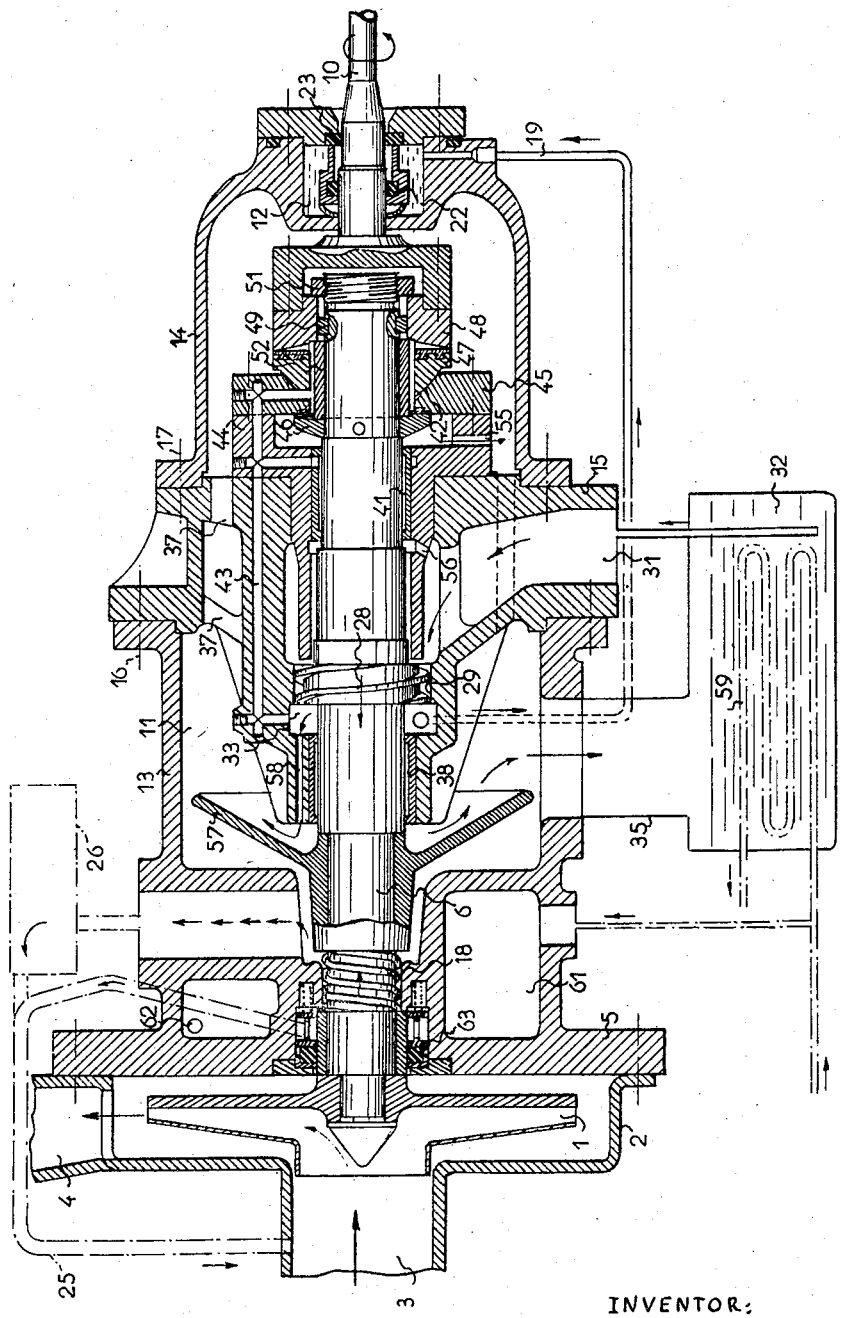
INVENTOR:
Pierre Audemar
BY
Richards & Geier
ATTORNEYS

United States Patent Office 2,844,418
Patented July 22, 1958

2,844,418

SHAFT SEAL

Pierre Audemar, Mulhouse, France, assignor to Societe Alsacienne de Constructions Mecaniques, Mulhouse (Haut-Rhin), France, a French company Application October 10, 1957, Serial No. 689,294

Claims priority, application France April 25, 1957

13 Claims. (Cl. 308—36.3)

This invention relates to a shaft seal and refers more particularly to a sealing device, the purpose of which is to prevent the escape of fluid around a driving shaft extending to a casing containing this fluid, the shaft being used to drive a mechanism located in this casing.

An object of the present invention is the provision of a device for use in combination with a fluid actuating apparatus, by means of which a shaft seal is assured through reinjection of fluid into a zone having a pressure which is substantially equal to the sealing pressure, so that the seal is effective under all conditions and particularly during stoppage.

Other objects of the present invention will become apparent in the course of the following specification, which describes, by way of example only, the application of the inventive idea to a gas compressor located in a casing and having a driving shaft extending through said casing.

In accomplishing the objects of the present invention, it was found desirable to arrange around a driving shaft right next to the location wherein the shaft emerges from the casing a first compartment or chamber, and to provide a second compartment or chamber adjacent the first compartment and likewise surrounding this shaft; fluid under pressure, such as oil in the case of the gas compressor referred to above, is sent to the second chamber, while means are provided which create around the shaft, on the one hand, a slight escape of the first fluid (in the case of a compressor, gas under pressure) from said casing to the first compartment; on the other hand, a flow of the second fluid (oil) is positively directed from the second compartment to the first compartment and is so arranged that all escape of the first fluid along the same passage is effectively prevented.

At least one of the means providing for the flow of fluids is constituted by a viscosity pump of the type described, for example, in the copending United States patent application, Ser. No. 518,276, filed June 27, 1955.

In pumps of this type, a liquid is transferred from an inlet to an outlet by adhering to the surface of a rotor rotating in a casing with a narrow angular or screw-shaped gap therebetween. It is apparent that then the first fluid such as the gas which penetrates into the first chamber, cannot leave the device by passing around the shaft into the second chamber. In the first chamber there will be a mixture of the first fluid, such as the gas which has leaked into the first chamber from the apparatus casing, and the second fluid, such as oil flowing from the second chamber. According to the invention, means are provided to separate this mixture and to reinject into the apparatus casing the first fluid after it has been separated from the particles of the second fluid.

In order to provide the escape of the first fluid from the apparatus casing into the first compartment, it is possible to provide a pressure in the apparatus casing which is greater than the pressure in the first compartment. A certain amount of the first fluid will flow automatically around the shaft into the first compartment and then means, such as a pump, must be provided to reinject the first fluid separated from the second fluid in the first compartment, so that it will flow under pressure back into the apparatus casing.

According to a different arrangement, the means provide the escape of the first fluid into the pump which creates in the first chamber a pressure greater than that which exists in the apparatus casing, so that purified gas leaving the first chamber can return automatically into the apparatus casing as the result of this difference in pressure.

In the case of a gas compressor referred to above, and if the second fluid consists of oil, the separation of the two fluids may be carried out effectively by means of an oil remover, the construction of which is well known in the art.

To transmit the second fluid under pressure into the second chamber, it is advantageous to utilize a pump which is driven directly by the shaft of the apparatus. According to one embodiment of the inventive idea, the pump is located within the first chamber and it delivers oil in such manner that not only is the oil caused to flow to the second compartment, but it is also used to lubricate the bearings and other parts located in the first chamber. The pump may be operated so as to circulate oil through suction. In the first compartment, there will be collected then oil passing from the second compartment and also oil which has served for lubrication purposes.

Furthermore, the second fluid, such as oil, may be caused to flow in a closed circuit.

In the case where the first fluid, such as gas, is very hot, the heat which is being transmitted to the shaft in the first compartment may be removed by providing a heat exchange with the second fluid, the circuit of which includes portions located outside of the device and capable of being cooled through the use of any suitable heat exchanger.

Furthermore, the efficiency of the cooling can be increased by providing the shaft with discs or radial vanes located within the first chamber.

According to another feature of the present invention, the escape of the fluid from the second chamber to the outside is prevented by providing upon an outer wall of the second compartment through which the driving shaft passes, a seal which is effective at least as far as the second fluid is concerned. This can be easily attained if the second fluid is oil, for example.

The invention will appear more clearly from the following detailed description when taken in connection with the accompanying drawing, showing by way of example only, a preferred embodiment of the inventive idea.

The sole figure of the drawing is a longitudinal axial section through a shaft seal constructed in accordance with the present invention.

In the example illustrated, the seal is intended for a shaft 6 which extends through the casing 2 of a compressor of hot gases located within the casing 2. This compressor, which is of the centrifugal type in the example illustrated, has a rotor 1 which is keyed upon the shaft 6. The casing 2 has an axial opening 3 for introducing the gas and a side opening 4 for the ejection of the compressed gas. The driving shaft 6 carries the rotor 1 upon one of its ends, while it is driven from another shaft 10 by any suitable means not shown in the drawing. The shaft seal of the present invention comprises a first chamber 11 located around the shaft 6 and extending to the immediate point wherein the shaft 6 emerges from the wall 5, constituting a part of the apparatus casing. A second chamber 12 is located next to the first chamber 11 and surrounds the shaft 10 constituting a continuation of the shaft 6.

The chamber 11 is formed by a substantially cylindrical casing 13, which may be cast jointly with the wall 5, and also by another substantially cylindrical casing 14 which serves as a continuation of the casing 13. The casings 13 and 14 are connected by means of a support 15 which also serves as a carrier for the shaft bearings. Casing portions 13, 14 and 15 may be held together along their flanges by bolts indicated diagrammatically by the numerals 16 and 17 in the drawings.

To provide a slight escape of the fluid around the shaft 6 from the apparatus casing 2 to the first chamber 11, there is provided at that location a pump, consisting of a few helical threads 18 grooved directly upon the shaft 6. The helical threads 18 are inclined relatively to the direction of rotation of the shaft 6, so that gases located in these threads will be sucked in by the pumping action which has thus been created and which caused a flow from the casing 2 into the chamber 11. This viscosity pump is generally of the type described in detail in the above-mentioned patent application.

The second chamber 12 receives oil under pressure through a conduit 19, for example, by means of a pump which will be described in detail hereinafter.

In this chamber the shaft 10 is enclosed by a sealing device comprising an annular member 21 and two annular members 22 and 23, which prevent the escape of oil from the second chamber 12 around the shaft and outside of the casing (to the right hand side of the drawing). On the other hand, oil may pass around the shaft 10 from the second chamber 12 to the first chamber 11 which is subjected to less pressure than the second chamber 12.

Thus, gas passing into the first chamber 11 from the compressor 2, and oil pasing into the first chamber 11 from the second chamber 12 are mixed in the first chamber 11. The excess in pressure created by the viscosity pump 18 makes it possible to provide a flow of gas out of the first chamber 11 and into the conduit 25, in the path of which is located an oil remover 26. Thus, oil particles are removed from the gas during its passage through the oil remover 26. Purified gas reaches the suction conduit 3 of the compressor.

It is possible to utilize a pump and an outer oil circuit for the purpose of transporting oil into the second chamber 12. However, in accordance with the example herein illustrated, a second viscosity pump 28 is used for this purpose, which is also formed of helical threads cut in the shaft 6 and cooperating with a bore hole 29 provided in the supporting casing 15 and connected by a passage 31 to an outer oil container 32.

The viscosity pump 28 transmits oil into a chamber 33 and thence oil is passed into the second chamber 12 through the conduit 19. Oil passing from the second chamber 12 to the first chamber 11 is returned to the container 32 by a passage 35 connected with the first chamber 11. Oil may pass from the right hand portion of the first chamber 11 enclosed by the casing 14 (looking in the direction of the drawing) into the other portion of the chamber 11 enclosed by the casing 13 through longitudinal holes or passages 37 provided in the supporting portion 15 of the casing.

One of the bearings, namely, the bearing 38, is mounted directly upon the supporting casing 15, while the other bearing 41 is mounted upon an intermediate piece 44 which may be integral with the supporting casing portion 15. The longitudinal reaction forces exerted upon the shaft 6, particularly those caused by the rotor 1 of the compressor, are absorbed by an abutting piece 45 fixed to the member 44. A disk 46 which is keyed upon the shaft 6, engages one of the surfaces of the abutting member 45 provided with a layer of anti-frictional metal. The other side of the abutting member 45, which is of spherical concave shape, is engaged by an annular member 47 having a spherical convex surface in engagement with the spherical surface of the piece 45. The other surface of the annular member 47 is flat and is also provided with an anti-frictional metal layer. This surface serves as a support for an annular member 48 which is mounted upon the shaft 6 and is firmly connected therewith by keys 49. A nut 51 is screwed upon the threaded end portion of the shaft 6 and holds firmly the piece 48 by means of an intermediate sleeve 52, which engages the disk 46. The members 45 and 47 are firmly connected with each other by stops (not shown), which are mounted with play so as to permit alignment of interengaging spherical surfaces.

As already stated, the drive of the shaft 6 is effected by means of a shaft 10 fixed to the member 48.

The oil pump 28 is also utilized to provide lubricant under pressure for the bearing 38, which is located next to the chamber 33; the bearing 41 and the surfaces of the members 45 and 47 are also lubricated in this manner. This lubrication takes place by means of conduits 43 which connect the chamber 33 with the second bearing 41 and the surfaces of the members 45 and 47.

Oil escaping from the bearing 38 drops directly into the chamber 11. Oil leaving the bearing 41 partly drops into the chamber 11 through the opening 55 and partly drops through the opening 56 into the suction conduit 31 of the oil pump.

In the example illustrated, the compressor 1 operates with very hot gases. Consequently, the shaft 6 is heated to a corresponding extent. A disk 57 is keyed upon the shaft 6 and is of frusto-conical shape in the example illustrated, so as to facilitate the cooling of the shaft 6.

Obviously, the disk 57 may be of other suitable shape, such as that of a flat annular surface, for example.

The disk 57 receives jets of oil under pressure which arrive from the chamber 33 and are projected through longitudinal channels 58 provided in the supporting portion 15 of the casing.

In order to cool the oil which circulates in a closed circuit between the first chamber 11, the container 32, and the second chamber 12, there is provided a heat exchanger constituted by a coil 59 through which passes a flow of cold water. The coil 59 is located within the oil container 32. Furthermore, cold water is also introduced into the annular chamber 61 which encloses the shaft 6 close to the location where the shaft 6 leaves the casing 2 of the compressor. Water is removed from the chamber 61 through a conduit designated by the numeral 62 in the drawing.

In the described embodiment of the invention, which pertains to a compressor drive, wherein the first chamber 11 is connected with the suction conduit 3 of the compressor, in order to provide that the gases leave the pump 18 without any substantial velocity, the admission side of this pump 18 is placed at the same pressure which prevails in the conduit 3 into which the pump 18 transmits the gas. For that purpose, a joint 63 is placed between the viscosity pump 18 and the adjacent surface of the compressor casing 2; furthermore, the conduit 25 is provided to connect the suction side of the pump 18 which the suction conduit 3 of the compressor. The joint 63 should not be a perfect seal, so that it will not prevent the passage of gases sucked in by the pump 18 from the compressor casing 2 toward the first chamber 11.

As a different construction, instead of connecting both the inlet and the outlet of the pump 18 to the suction conduit 3 of the compressor, it is possible to connect both the inlet and the outlet of the pump 18 to the outlet 4 of the compressor 1.

The described apparatus operates as follows:

When the shaft 6 is driven, the rotor of the compressor 1 will suck in the gases through the conduit 3 and will eject them through the conduit 4. A small amount of gases flowing around the shaft 6 will pass through the joint 63 and will be sucked in by the pump 18. The pump 18 will transmit the gases into the first chamber 11, wherein they are mixed with oil which arrives into the chamber 11 from the second chamber 12. The mixture of gas and oil passes through the oil remover 26. Gases purified from oil return through the conduit 25 into the suction conduit 3 of the compressor, while oil recovered in the oil remover 26 drops back into the first chamber 11.

Oil contained in the first chamber 11 cannot penetrate into the compressor 1, since the circulation of gas around the shaft 6 created by the pump 18 is in the opposite direction and prevents such passage of oil. For a similar reason, gases located in the first chamber 11 cannot escape out of the device around the shaft 10, since in order to do so, they would have to pass first through the second chamber 12, wherein a circulation of oil under pressure takes place in the opposite direction, namely, from the second chamber 12 into the first chamber 11.

As already stated, the viscosity pump 28 transmits oil through the chamber 33 and the conduit 19 into the second chamber 12, while oil drops into the oil container 32 from the first chamber 11 through the passage 35. The passage of oil within the chamber 11 takes place through the longitudinal openings 37.

Thus, in the described construction there is a circuit for the return of the purified gas between the first compartment 11 and the compressor 1, as well as a circuit for the return of oil between the first chamber 11 and the second chamber 12.

When the apparatus is not operated, the pressures in the casing 2 and in the first chamber 11 are the same, so that oil located in the chamber 11 flows down by gravity to the container 32 and will not pass along the shaft 6 to the casing 2 and still less through the conduit 25.

It is apparent that the example shown above has been given solely by way of illustration and not by way of limitation, and that it is subject to many variations and modifications within the scope of the present invention. All such variations and modifications are to be included within the scope of the present invention.

What is claimed is:

1. In combination with a fluid-actuating apparatus, a casing enclosing said apparatus and a shaft carrying said apparatus and extending through said casing; a shaft seal for said fluid, said seal comprising means forming a first chamber which encloses said shaft and is located adjacent to said casing, means forming a second chamber which encloses said shaft and is located adjacent to and in communication with the first chamber, means transmitting under pressure a second fluid to the second chamber and from the second chamber to the first chamber, a pump transmitting the first-mentioned fluid from said casing to the first chamber, whereby the first-mentioned fluid and the second fluid are mixed in the first chamber, means communicating with the first chamber for separating the mixture, and means connected with the last-mentioned means and with said casing for transmitting the separated first-mentioned fluid back to said casing.

2. A shaft seal in accordance with claim 1, wherein said pump provides pressure in the first chamber which is more than the pressure in said casing.

3. A shaft seal in accordance with claim 1, wherein the means transmitting the separated first-mentioned fluid back to said casing include a pump.

4. A shaft seal in accordance with claim 1, wherein the means transmitting the separated first-mentioned fluid back to said casing include a conduit extending from the first chamber to said casing.

5. In combination with a fluid-actuating apparatus, a casing enclosing said apparatus and a shaft carrying said apparatus and extending through said casing; a shaft seal for said fluid, said seal comprising means forming a first chamber which encloses said shaft and is located adjacent to said casing, means forming a second chamber which encloses said shaft and is located adjacent to and in communication with the first chamber, a pump located in one of said chambers and actuated by said shaft for transmitting under pressure a second fluid to the second chamber and from the second chamber to the first chamber, another pump transmitting the first-mentioned fluid from said casing to the first chamber, whereby the first-mentioned fluid and the second fluid are mixed in the first chamber, means communicating with the first chamber for separating the mixture, and means connected with the last-mentioned means and with said casing for transmitting the separated first-mentioned fluid back to said casing.

6. A shaft seal in accordance with claim 5, wherein at least one of said pumps is a viscosity pump comprising helical grooves formed in said shaft.

7. In combination with a fluid-actuating apparatus, a casing enclosing said apparatus and a shaft carrying said apparatus and extending through said casing; a shaft seal for said fluid, said seal comprising means forming a first chamber which encloses said shaft and is located adjacent to said casing, means forming a second chamber which encloses said shaft and is located adjacent to and in communication with the first chamber, said shaft extending through the two chambers and beyond the second chamber, means transmitting under pressure a second fluid to the second chamber and from the second chamber to the first chamber, the means forming the second chamber comprising an outer seal enclosing said shaft to prevent an outer escape of said second fluid, a pump transmitting the first-mentioned fluid from said casing to the first chamber, whereby the first-mentioned fluid and the second fluid are mixed in the first chamber, means communicating with the first chamber for separating the mixture, and means connected with the last-mentioned means and with said casing for transmitting the separated first-mentioned fluid back to said casing.

8. In combination with a fluid-actuating apparatus, a casing enclosing said apparatus and a shaft carrying said apparatus and extending through said casing; a shaft seal for said fluid, said seal comprising means forming a first chamber which encloses said shaft and is located adjacent to said casing, means forming a second chamber which encloses said shaft and is located adjacent to and in communication with the first chamber, means transmitting under pressure a second fluid to the second chamber and from the second chamber to the first chamber, a pump transmitting the first-mentioned fluid from said casing to the first chamber, whereby the first-mentioned fluid and the second fluid are mixed in the first chamber, means communicating with the first chamber for separating the mixture, a cooling disc mounted upon said shaft within the first chamber and engaged by the first-mentioned fluid for cooling the same, and means connected with the last-mentioned means and with said casing for transmitting the separated first-mentioned fluid back to said casing.

9. A shaft seal in accordance with claim 8, wherein the means forming the first chamber comprises means projecting some of the second fluid upon said cooling disc.

10. In combination with a fluid-actuating apparatus, a casing enclosing said apparatus and a shaft carrying said apparatus and extending through said casing; a shaft seal for said fluid, said seal comprising means forming a first chamber which encloses said shaft and is located adjacent to said casing, said means comprising bearings for said shaft, means forming a second chamber which encloses said shaft and is located adjacent to and in communication with the first chamber, means transmitting under pressure oil to the second chamber and from the second chamber to the first chamber and to said bearings to lubricate the bearings, a pump transmitting said fluid from said casing to the first chamber, whereby said fluid and said oil are mixed in the first chamber, means communicating with the first chamber for separating the mixture, and means connected with the last-mentioned means and with said casing for transmitting the separated fluid back to said casing.

11. In combination with a fluid-actuating apparatus, a casing enclosing said apparatus and a shaft carrying said apparatus and extending through said casing; a shaft seal for said fluid, said seal comprising means forming a first chamber which encloses said shaft and is located adjacent to said casing, means forming a second chamber which encloses said shaft and is located adjacent to and in communication with the first chamber, means transmitting under pressure oil to the second chamber and from the second chamber to the first chamber, means communicating with the two chambers and providing a closed circuit for the circulation of said oil, the last-mentioned means comprising a container for the oil located outside of said chambers and a cooling device communicating with said container, a pump transmitting said fluid from said casing to the first chamber, whereby said fluid and said oil are mixed in the first chamber, means communicating with the first chamber for separating the mixture, and means connected with the last-mentioned means and with said casing for transmitting the separated fluid back to said casing.

12. A shaft seal in accordance with claim 11, wherein said cooling device consists of a heat-exchanging cold-water coil located within said container.

13. In combination with a gas-actuating apparatus, a casing enclosing said apparatus and a shaft carrying said apparatus and extending through said casing; a shaft seal for said gas, said seal comprising means forming a first chamber which encloses said shaft and is located adjacent to said casing, means forming a second chamber which encloses said shaft and is located adjacent to and in communication with the first chamber, means transmitting under pressure oil to the second chamber and from the second chamber to the first chamber, a pump transmitting said gas from said casing to the first chamber, whereby said gas and said oil are mixed in the first chamber, an oil separator communicating with the first chamber, and means connected with the oil separator and said casing for transmitting the separated gas back to said casing.

References Cited in the file of this patent

UNITED STATES PATENTS 2,777,395     Disbrow _____ Jan. 15, 1957